July 26, 1960 C. J. BOYER 2,946,063
MOLDED SUSPENSION FOR SAFETY HAT
Filed April 28, 1959 2 Sheets-Sheet 1

INVENTOR.
Charles J Boyer.
BY
William J Ruano
ATTORNEY.

July 26, 1960  C. J. BOYER  2,946,063
MOLDED SUSPENSION FOR SAFETY HAT
Filed April 28, 1959  2 Sheets-Sheet 2

INVENTOR.
Charles J. Boyer
BY
William J. Ruano
ATTORNEY.

United States Patent Office 2,946,063
Patented July 26, 1960

2,946,063

MOLDED SUSPENSION FOR SAFETY HAT

Charles J. Boyer, West Reading, Pa., assignor to The Electric Storage Battery Company, Philadelphia, Pa.

Filed Apr. 28, 1959, Ser. No. 809,434

6 Claims. (Cl. 2—3)

This invention relates to a molded suspension for a safety heat and, more particularly, to a one piece molded suspension for adjustably supporting the sweatband and for protecting the wearer against blows or falling objects on the hat, as well as providing a support for adjustable chin and head straps.

An outstanding disadvantage of conventional headband suspensions for safety hats is that they are relatively complicated and expensive in construction, usually involving a large number of separate parts sewn or otherwise fastened together; furthermore they do not provide the necessary protection or adjustability for different headsizes, and in cases wherein such adjustability is provided, adjustments are not easy to make and generally require removal of the suspension from the hat.

An object of the present invention is to provide a unitary, molded headband suspension for a safety hat which is devoid of the above named disadvantages and which will provide substantially greater protection against blows and which will provide adjustability as well as simplicity and compactness in design and which may be easily, quickly and inexpensively manufactured.

Other objects and advantages of my invention will become apparent from a study of the following description taken with the accompanying drawings wherein.

Figure 1:
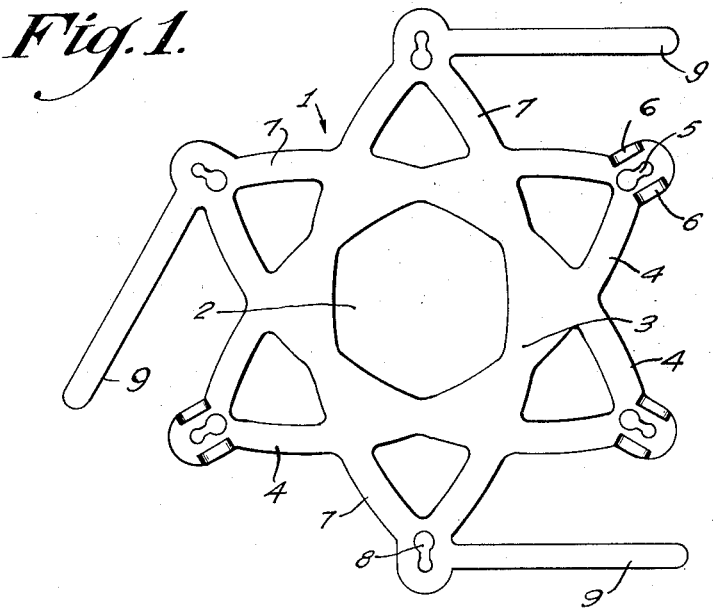
Figure 1 is a plan view of the crown portion of a molded plastic suspension for a safety hat as viewed by looking inside the hat and which embodies features of the present invention.
Figure 4:
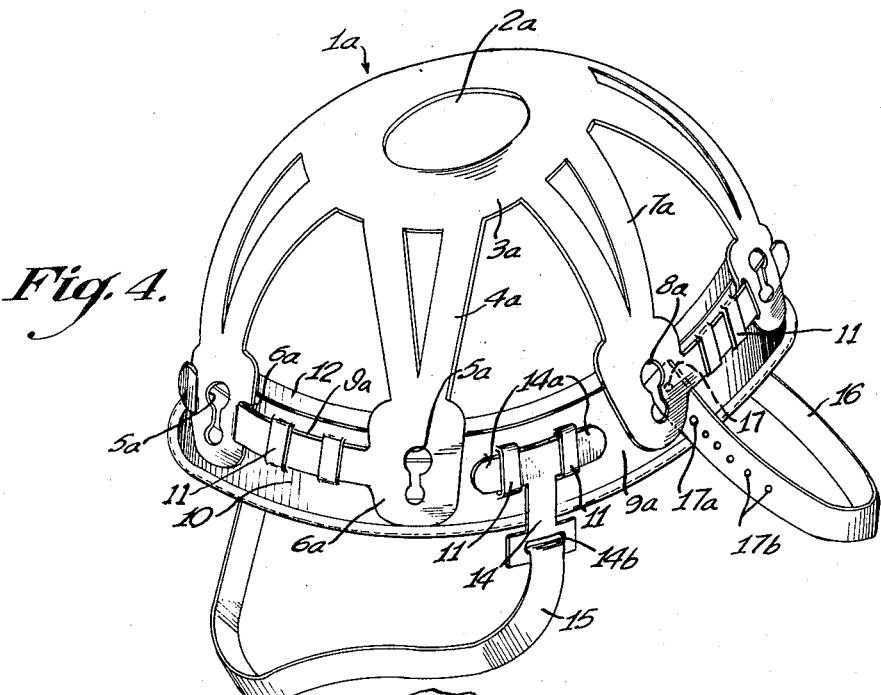
Fig. 4 is a perspective view showing a complete suspension assembly for a safety hat (not shown) including the molded crown suspension portion shown in Fig. 2, the headband and sweatband shown in Fig. 3, and, in addition, chin and head straps.

Referring more particularly to Fig. 1 of the drawing, numeral 1 denotes, generally, a one piece, molded plastic crown portion of a suspension for a safety hat, preferably made of polyethylene, polystyrene, or other flexible plastic material. Crown portion 1 has a central, cut-out portion or hole 2 to prevent the occurrence of strap portions intersecting at the center of the crown portion which would tend to transfer a considerable part of the impact or force of a blow on the hat to the head of the wearer. Opening 2 is surrounded by substantially circular portion 3, and from such circular portion there extend, in radially outward directions, a plurality of substantially triangular portions, such as 4 and 7 terminating in apices in which are cut-out keyhole or other suitable slots, such as 5 and 8. It should be noted that the entire crown portion shown in Fig. 1 is preferably dished out into somewhat hemispherical shape to conform more closely to the contour of the head of the wearer in the same manner as the modification thereof (1a) is illustrated in Fig. 4. Thus the molding dies must be cup shaped or somewhat hemispherically shaped in order to produce this particular shape of the crown portion of the suspension.

It will be further noted that the triangular portions are in pairs, such as 4 and 7, one of each pair, namely 7, having an integral strap 9, and the other of each pair having loops 6 into which strap 9 is passed. More specifically, at the apex of triangular portions 4 radial slits are provided so as to permit the formation of loops, such as 6, or, better still, the molds are so shaped so as to mold loop shapes 6 so as to project radially inwardly (or outwardly) from the plane of the crown portion so as to accommodate the strap emanating from the adjoining triangular portion in a manner so as to form a close, friction fit. Selective portions of strap 9 may be extended through the two loops so as to adjust the distance between the apices of adjoining triangular portions to adjust the suspension to different head sizes and so as to frictionally hold the selected adjustment. The straps 9 fit into the loops 6 in the same manner that straps 9a fit into loops 6a in the embodiment shown in Fig. 4.

Figure 2:
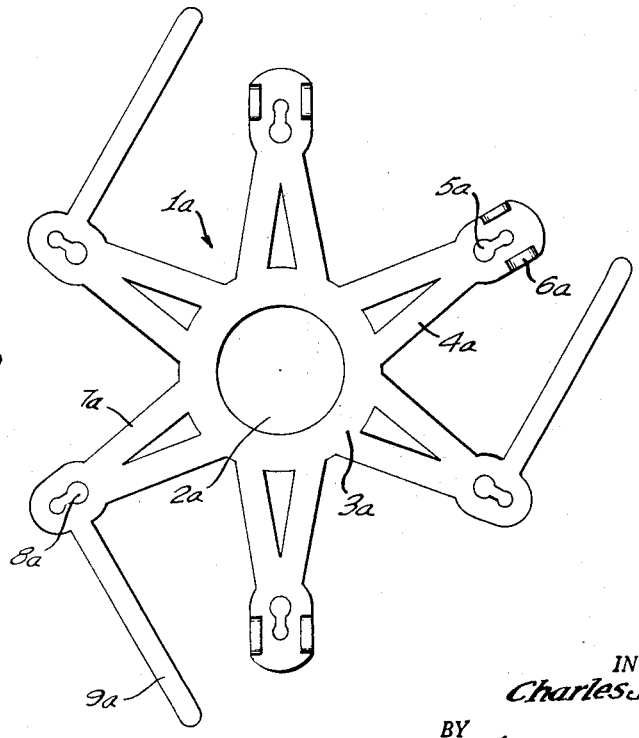
Fig. 2 is a modification of the crown suspension portion shown in Fig. 1.

Fig. 2 shows a modification 1a of the crown portion of the suspension, which modification is also a one piece, molded plastic part, but which may be molded in a flat plane, as distinguished from the curved plane in which part 1, shown in Fig. 1, is molded. The suspension is provided with a central hole 2a which is encircled by a circular portion 3a forming bases from which extend, a plurality of integral, triangular portions such as 4a and 7a, which terminate in apices having cut-out keyhole slots, such as 5a and 8a. Adjoining trtiangular portions 4a and 7a form a plurality of pairs which are secured together by means of straps, such as 9a, which are extended through loop portions 6a which are preferably molded so as to project away from the plane of the portion 4a to fit the strap more closely and to allow the strap to more easily extend therethrough by any desired amount to adjust the distance between adjoining pairs of apices and thereby adjust the suspension to fit the head of the wearer.

Figure 3:
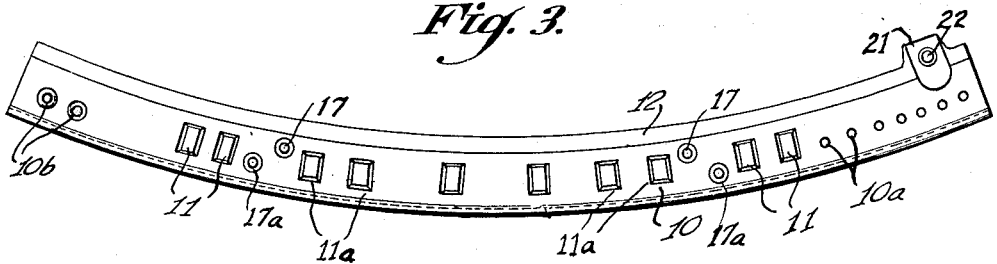
Fig. 3 is a plan view of the headband and sweatband assembly when laid out in a flat plane and shown separately from the crown suspension portion.

Fig. 3 shows a plastic headband 10 preferably of the same material of which the crown suspension portion is made, which headband portion 10 is provided at one end portion, with a plurality of spaced aligned holes, such as 10a and collar buttons 10b extending through a hole formed in the other end portion. When the ends of headband are overlapped the collar buttons 10b may be selectively inserted in any of the holes to adjust the circumference or girth of the strap when bent into oval form. Strap loops, such as 11, are integrally molded on the headband and project radially outwardly from the plane of headband 10 so as to facilitate extension therethrough of the strap portions, such as 9 in Fig. 1 and 9a in Fig. 2, as will be illustrated more clearly in Fig. 4. Sewed onto the bottom edge of the plastic headband 10 is a sweatband 12 which extends along the entire inner surface of the plastic headband, when worn, so as to protect the head of the wearer. Sweat band securing tab 21 is anchored by collar button 22.

Figure 5:
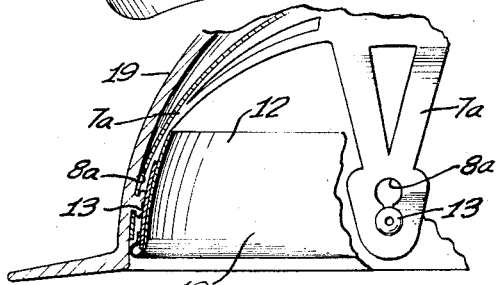
Fig. 5 is a fragmentary, cross-sectional view showing how the suspension of Fig. 4 is detachably fastened to the interior surface of a safety hat.

Fig. 4 shows a complete suspension assembly for a safety hat 19 (Fig. 5) incorporating the modification 1a of the crown portion shown in Fig. 2 and illustrating more clearly how the various parts are fitted together. It will be especially noted that the crown portion 1a of the suspension is secured to the headband portion 10 by means of the straps 9a of the crown portion which extend through the loops 11 integrally formed on the headband 10. Crown portion 1a is attached to the inside of a safety hat in the manner shown in Fig. 5, that is, by inserting radially inwardly extending headed studs 13 into the keyhole slots 5a and 8a. Other detachable fastening means may be used instead, such as molded wedge shaped slots in the hat into which wedge shaped fastening elements are fitted which are integral with the triangular apices.

It will be further noted that, if desired, there may also extend through loops 11 the lateral ears 14a of a T-shaped buckle portion 14 which may be either of plastic or metal and having a bottom slot 14b into which is adjustably looped a chin strap 15 which may be of any suitable material, or even of the same plastic material as the crown portion. Buckle 14 is inserted in chin strap buckle loops 11a. If desired, a second strap, such as a head strap 16, may pe provided having a plurality of aligned holes 17b for adjusting the length of the head strap to fit around the rear portion of the head to more securely hold the suspension onto the head and prevent falling off of the safety hat upon bending over by the wearer. The end portions of the head strap may be fastened to the headband 10 by projecting collar buttons, such as 17 and 17a, through selective holes 17b in the end portions of the head strap.

An important feature of the present invention resides in the fact that the entire suspension assembly may be made of plastic material, thereby enabling easy washing and disinfecting of the entire assembly. Moreover, the assembly may be easily put together or disassembled and the parts are fitted together very easily and are readily adjustable even when the assembly is mounted on the head of the wearer.

Moreover, in the event of a very severe blow on the hat, the plastic is yieldable to an extent to prevent transfer of the shock directly to the head and is so shaped so as to more uniformly transfer a minimum portion of the force to the head.

Thus it will be seen that I have provided an efficient, molded suspension for a safety hat which suspension is of unitary construction and consists entirely of plastic material so that it may be readily washed and disinfected, also which suspension is readily adjustable even while being worn, and onto which may be readily attached auxiliary strap elements such as a chin strap and head strap, in an adjustable manner; furthermore I have provided a headband suspension which eliminates the transfer of direct, injurious shocks to the head, thereby providing maximum safety for the wearer.

Since I have illustrated and described several embodiments of my invention, it will be understood that these are by way of illustration only, and that various changes and modifications may be made within the contemplation of my invention and within the scope of the following claims.

I claim:

1. A suspension for a safety hat comprising an integrally molded crown portion of flexible plastic material, comprising a central, substantially circular portion and a plurality of triangular portions extending substantially radially outwardly from said circular portion and each terminating in an apex portion, said circular portion forming the bases of said triangular portions, a keyhole slot formed in each of said apex portions, said triangular portions being in pairs, one triangular portion of each pair having an integral strap extending substantially tangentially from the apex portion, and the other triangular portion of each pair having a loop formed in the apex portion through which said strap may be adjustably extended and into which it is snugly and frictionally fitted for adjusting the distance between the apices of said pair and thereby adjust the crown portion to fit the wearer's head.

2. A headband suspension as recited in claim 1 wherein said suspension is dish shaped and of substantially hemispherical contour to more closely fit the shape of the head.

3. A headband suspension for a safety hat, comprising an integrally molded crown portion comprising a central circular portion and a plurality of substantially radially extending pairs of arms, each pair converging together at the extremities to form an apex portion of a triangle, a keyhole slot formed in each apex portion, the triangular portions being in pairs, one of each pair having a tangentially extending integral strap and the other of each pair having loop means through which said strap is snugly and frictionally fitted and adapted to extend for adjusting the distance between the apex portions to conform the suspension to the head of the wearer, an adjustable headband portion of plastic material having integral loops extending radially outwardly, through which said straps extend in order to attach the crown portion to the headband portion, and a sweatband secured to the inside of said headband portion.

4. In combination with a safety hat having a detachable connector element extending inwardly from the inner surface of the hat adjacent the headband portion, a crown portion of molded plastic material comprising a plurality of integral, substantially radially outwardly extending triangular portions and a central substantially annular portion from which said triangular portions emanate, said triangular portions terminating in apices, each of which has a mating detachable connector element, said triangular portions being in pairs, one of each pair having a tangentially extending strap and the other of each pair having an outwardly molded loop through which said strap may be extended, a headband of plastic material having circumferentially spaced loops through which intermediate portions of said straps extend in order to fasten the crown portion to the headband, said headband having a plurality of slots at one end and collar button-like elements at the other which may be selectively inserted in any of the slots to adjust the girth of the headband.

5. The combination as recited in claim 4 together with a head strap which is adjustably secured to the rear portion of said headband including adjustable means for adjusting the length thereof, so as to securely hold the suspension and hat on the wearer's head even when the hat is tipped.

6. A headband suspension as recited in claim 4 together with a chin strap of adjustable length having T-shaped buckles at the ends, additional circumferentially spaced loops on said headband, the laterally extending portions of the T extending through said additional loops on the plastic headband.

References Cited in the file of this patent

UNITED STATES PATENTS

| | | |
|---|---|---|
| 1,602,727 | Turner | Oct. 12, 1926 |
| 1,624,727 | Goldberg | Apr. 12, 1927 |
| 2,710,965 | Bowers | June 21, 1955 |
| 2,735,099 | Lewis | Feb. 21, 1956 |
| 2,763,863 | Bowers | Sept. 25, 1956 |